United States Patent
Radle et al.

(10) Patent No.: US 8,434,741 B2
(45) Date of Patent: May 7, 2013

(54) POWERED CABLE PULLER

(75) Inventors: Patrick J. Radle, Mequon, WI (US); Michael A. Schrauth, De Pere, WI (US); Christian P. Coulis, Sussex, WI (US); Edward A. Haase, South Milwaukee, WI (US); Anthony W. Gilbert, Waukesha, WI (US)

(73) Assignee: Actuant Corporation, Menomonee Falls, WI (US)

( * ) Notice: Subject to any disclaimer, the term of this patent is extended or adjusted under 35 U.S.C. 154(b) by 366 days.

(21) Appl. No.: 12/825,499

(22) Filed: Jun. 29, 2010

(65) Prior Publication Data

US 2010/0327242 A1  Dec. 30, 2010

Related U.S. Application Data

(60) Provisional application No. 61/221,290, filed on Jun. 29, 2009.

(51) Int. Cl.
  *E21C 29/16* (2006.01)
(52) U.S. Cl.
  USPC ............................ 254/134.3 FT; 254/134.3 R
(58) Field of Classification Search ........... 254/134.3 R, 254/134.3 FT, 389, 403, 407, 326, 423; 226/193
  See application file for complete search history.

(56) References Cited

U.S. PATENT DOCUMENTS

| | | | | |
|---|---|---|---|---|
| 3,968,952 | A * | 7/1976 | Newell | 254/134.3 R |
| 4,456,225 | A * | 6/1984 | Lucas | 254/134.3 FT |
| 5,226,776 | A * | 7/1993 | Vestergaard | 414/680 |
| 5,645,265 | A * | 7/1997 | Shu | 254/134.3 FT |
| 5,984,273 | A | 11/1999 | Ray | |
| 6,286,815 | B1 | 9/2001 | Ray | |
| 6,682,050 | B1 | 1/2004 | Ray | |
| 7,070,168 | B2 | 7/2006 | Plummer | |
| 7,216,848 | B2 * | 5/2007 | Plummer | 254/134.3 FT |
| 7,832,709 | B2 * | 11/2010 | O'Connor | 254/134.3 R |
| 2001/0050359 | A1 * | 12/2001 | Tominaga et al. | 254/8 B |
| 2003/0098450 | A1 * | 5/2003 | Cook et al. | 254/134.3 R |
| 2007/0105443 | A1 | 5/2007 | Ray | |
| 2007/0221896 | A1 | 9/2007 | Jordan et al. | |
| 2007/0284559 | A1 * | 12/2007 | Plummer | 254/134.3 FT |
| 2008/0134465 | A1 * | 6/2008 | Yueh | 16/110.1 |
| 2008/0224108 | A1 * | 9/2008 | O'Connor | 254/134.5 |

OTHER PUBLICATIONS

Maxis Pull-It 6000—6,000 Pound Cable Puller, www.maxis-tools.com, accessed Nov. 20, 2008.
Maxis Pull-It 10K—10,000 Pound Cable Puller, www.maxis-tools.com, accessed Nov. 20, 2008.
Greenlee Cable Puller, UPC #00993, www.mygreenlee.com, Copyright 2007 Greenlee Textron Inc.
Greenlee Ultra Tugger Cable Puller with Standard Force Gauge and Floor Mount, UPC #00985, www.mygreenlee.com, Copyright 2007 Greenlee Textron Inc.

* cited by examiner

*Primary Examiner* — Basil Katcheves
*Assistant Examiner* — Beth Stephan

(57) ABSTRACT

An apparatus for pulling a cable through a conduit includes a frame that has a base. The apparatus further includes a boom that has at least one roller configured to guide a rope connected to the cable along the boom. The boom also includes a main boom pivotally connected to the base and an upper boom pivotally connected to the main boom. A drive unit connects to the boom and includes a rotatable spool configured to pull the rope along the boom. The apparatus further includes a lift pivotally connected to the frame and the boom. The lift is operable to move the boom relative to the frame.

18 Claims, 14 Drawing Sheets

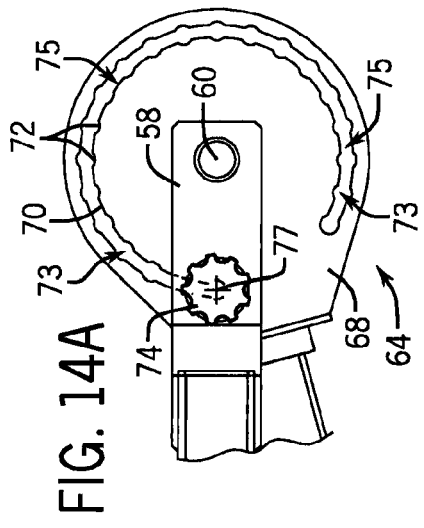
FIG. 14A
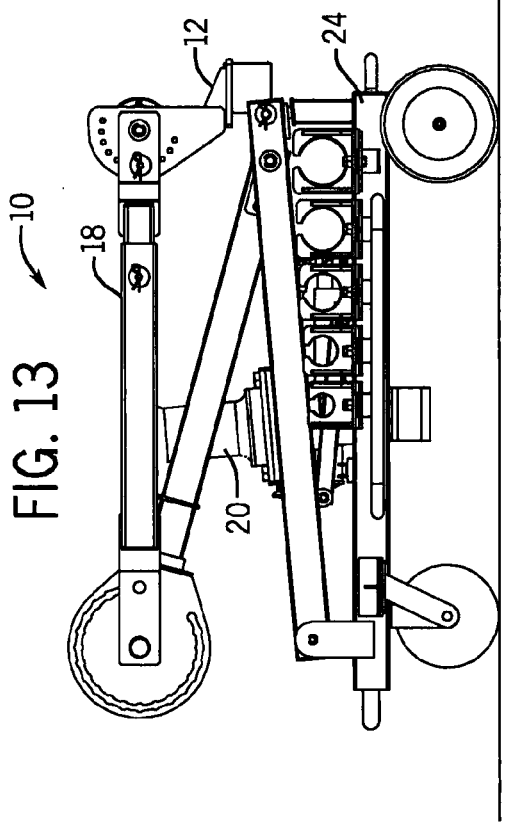
FIG. 13
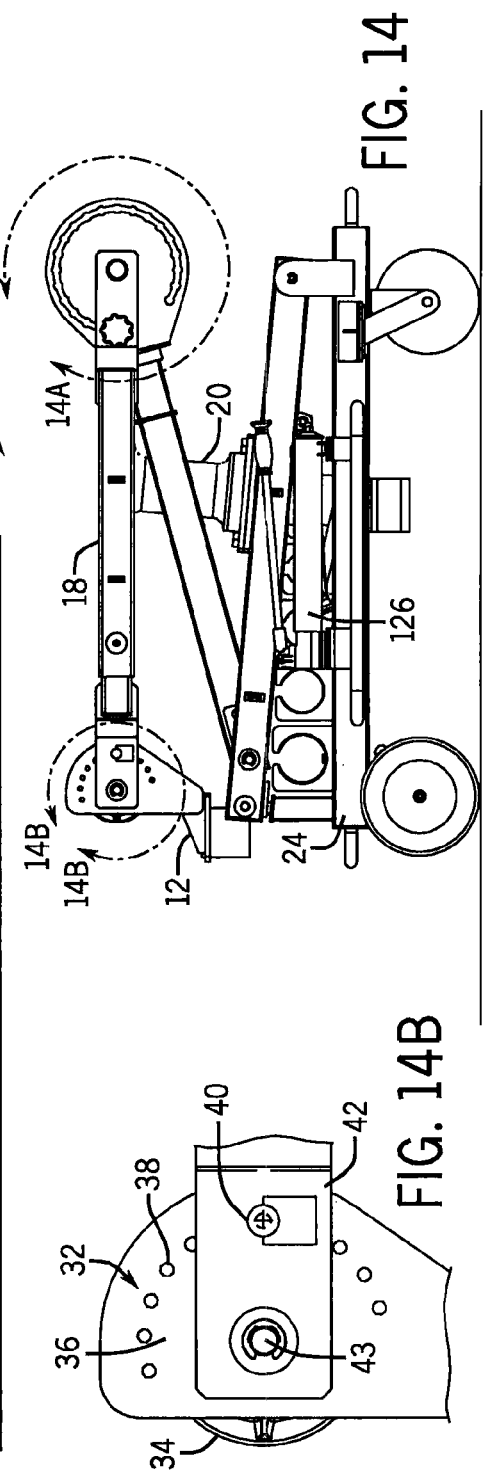
FIG. 14
FIG. 14B

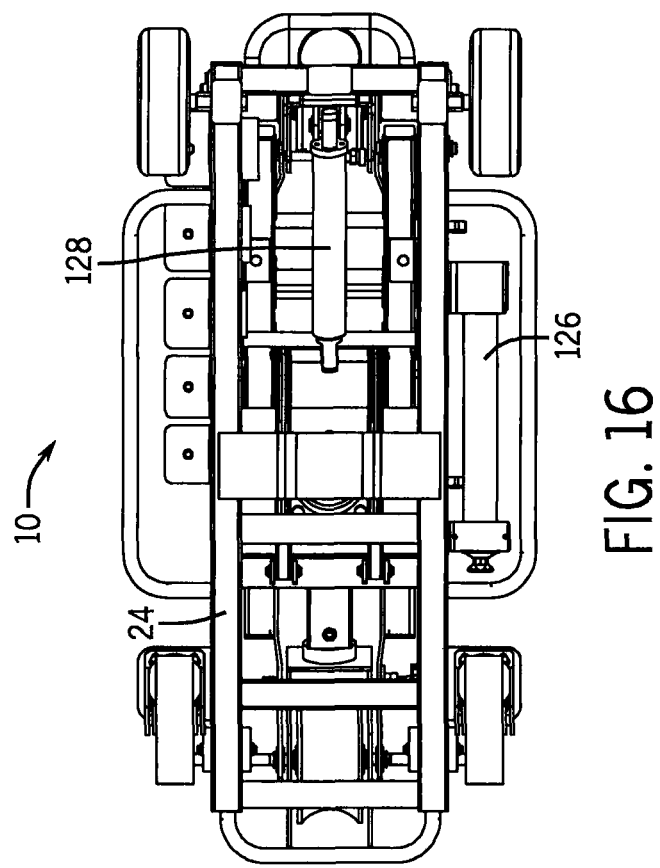
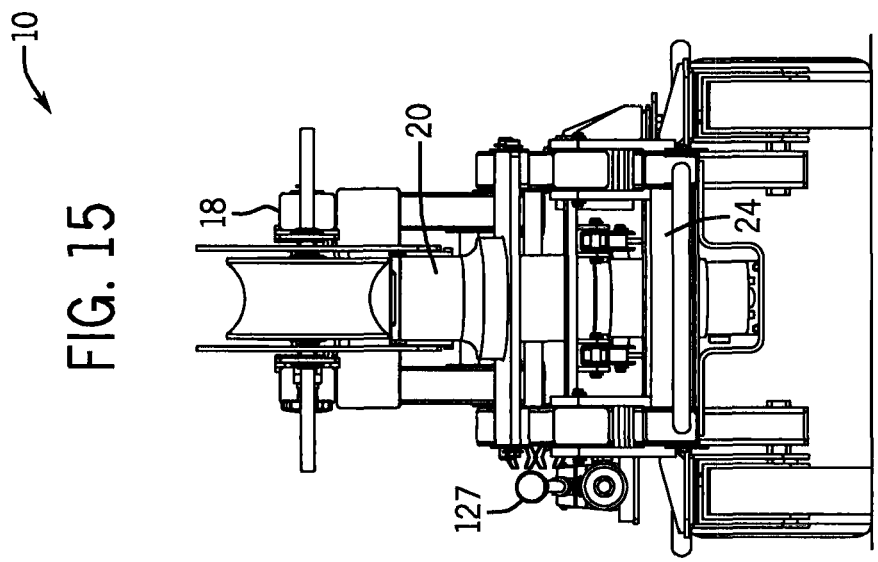

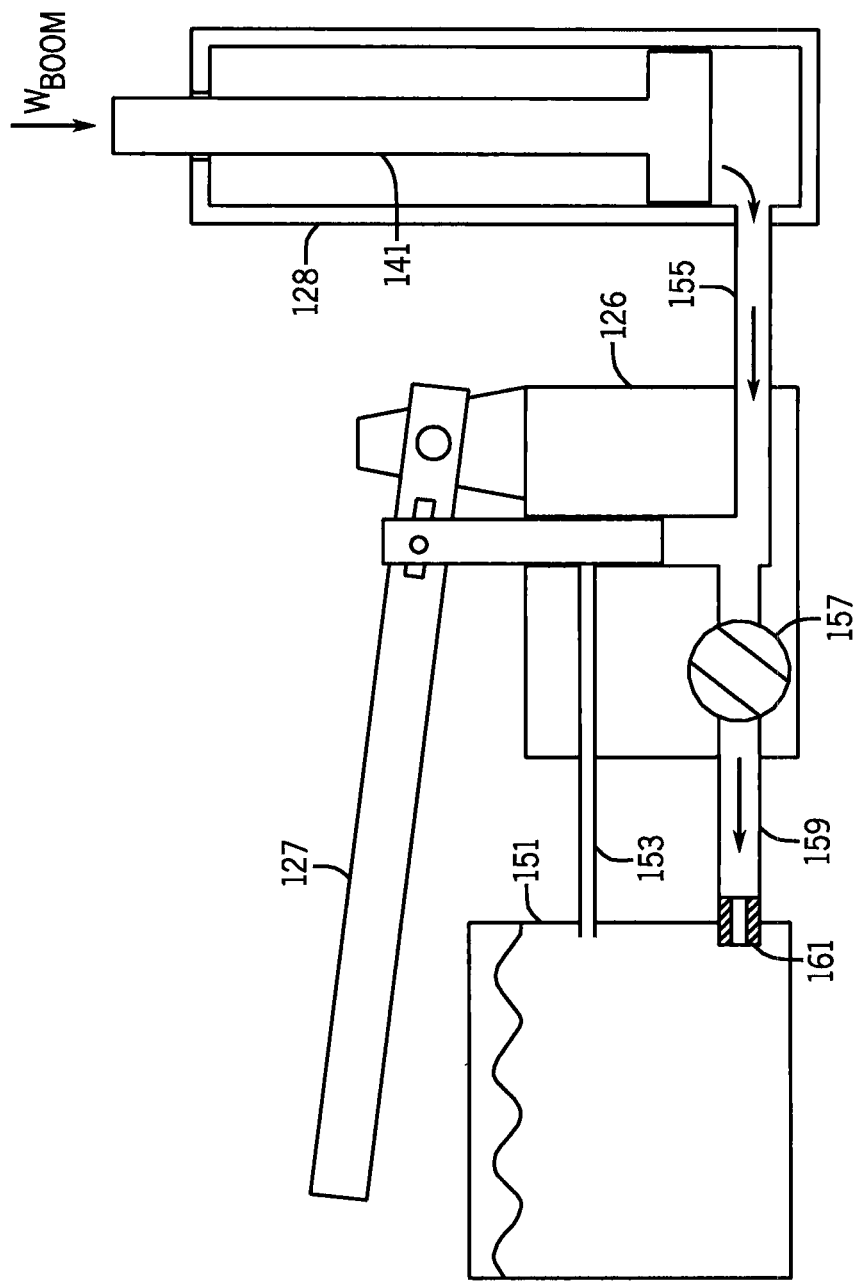

POWERED CABLE PULLER

CROSS-REFERENCE TO RELATED APPLICATION

This application claims the benefit of U.S. Provisional Patent Application No. 61/221,290 filed Jun. 29, 2009, the disclosure of which is hereby incorporated by reference in its entirety.

STATEMENT CONCERNING FEDERALLY SPONSORED RESEARCH OR DEVELOPMENT

Not Applicable.

BACKGROUND OF THE INVENTION

The present invention relates to powered cable pullers for routing cables and wiring through conduits.

Cable pullers are well-known devices for pulling power cables, data cables, or other wiring through both horizontal and vertical building conduits; the cables are usually pulled upwardly (referred to as an "up-pull") or downwardly (referred to as a "down-pull"). Typical cable puller designs include a rope that connects to and pulls cables through the conduit and a conduit adapter that connects to the conduit to help support the device. In some designs, the conduit adapter is reconfigurable or interchangeable with other adapters to connect to conduits of various sizes. Typical puller designs also include a boom connected to the conduit adapter that guides the rope to a drive unit that rotates to pull the rope. The boom includes multiple sections that are connected by one or more pivotal joints. The pivotal joints permit the boom to be accurately repositioned such that the device is suitable for use with conduits that terminate at various heights.

Typical cable puller designs, while eliminating the need for contractors or other technicians to manually pull cables through building conduits, include several drawbacks. For example, some pullers are designed to have relatively high pulling capacities (e.g., 6000 lbs or more) to overcome large friction forces when a cable is pulled through a long conduit. High pulling capacity is typically provided by using a larger drive unit. In addition, the boom and other components are typically thick metal components to provide durability and resistance to deflection due to the high pulling forces. As a result, the large drive unit and boom cause the device to be very heavy (e.g., 75 lbs. or more) and difficult to reposition. A technician can be fatigued easily by lifting and carrying such a puller if many consecutive pulls are performed.

A number of designs have been created in an attempt to overcome the drawback of having to carry a cable puller between different locations. For instance, some cable puller designs include a base with wheels that support the drive unit and the boom. Such designs permit even larger drive units and booms to be used to further increase pulling capacity. The size of the base may prevent these pullers from accessing smaller areas in which the aforementioned designs fit easily. In addition, puller designs with wheels are typically difficult for a technician to push because the base is only inches off the ground.

All of the aforementioned puller designs are difficult to accurately reposition after the puller is moved to the general location of the conduit (i.e., difficult to accurately adjust the boom to connect the conduit adapter to the conduit). This problem occurs in part due to the weight of the cable puller as described above. In addition, the pivotal joints of the boom each include a pin that must be completely removed to reposition the boom sections. After the boom is accurately repositioned, the pin must be inserted into the joint while holding the puller in engagement with the conduit. This can be particularly difficult if a single technician must set up the power puller without assistance.

Further still, some of the aforementioned designs require a technician to partially disassemble the boom to switch between appropriate up-pull and down-pull configurations. For example, it may be necessary to separate the boom sections and reverse the orientation of several boom sections relative other sections. Such actions can be time consuming and can fatigue a technician.

Considering the limitations of the previous powered puller designs, a need exists for a design that is easily moved and reconfigured at a work site. A need also exists for such a cable puller to have a high pulling capacity.

SUMMARY OF THE INVENTION

In one aspect, the present invention provides an apparatus for pulling a cable through a conduit. The apparatus comprises a frame that includes a base. The apparatus further comprises a boom that includes at least one roller configured to guide a rope connected to the cable along the boom. The boom also includes a main boom pivotally connected to the base and an upper boom pivotally connected to the main boom. A drive unit connects to the boom and includes a rotatable spool configured to pull the rope along the boom. The apparatus further comprises a lift pivotally connected to the frame and the boom. The lift is operable to move the boom relative to the frame.

In another aspect, the present invention provides an apparatus for pulling a cable through a conduit. The apparatus comprises a frame and a boom pivotally connected to the frame. The boom includes at least one roller configured to guide a rope connected to the cable along the boom. The boom further includes a first member, a second member, and a joint connecting the first member to the second member. The joint defines a first axis about which the second member is pivotable relative to the first member and a second axis about which the second member is rotatable relative to the first member. The second axis is perpendicular to the first axis.

In another aspect, the present invention provides an apparatus for pulling a cable through a conduit. The apparatus comprises a frame and a boom pivotally connected to the frame. The boom is configured to guide a rope connected to the cable along the boom. The boom includes a first member, a second member, and a joint pivotally connecting the first member to the second member. The joint includes a pin having an axis and is movable axially from a first position to a second position and vice versa. In the first position the pin fixes the first and second members angularly relative to one another. In the second position the pin permits the first and second members to pivot relative to one another. In both the first position and the second position the pin is constrained by the joint. The pin is biased toward the first position. The joint further includes an adjustment slot through which the pin moves when the pin is in the second position.

The foregoing and advantages of the invention will appear in the detailed description which follows. In the description, reference is made to the accompanying drawings which illustrate a preferred embodiment of the invention.

BRIEF DESCRIPTION OF THE DRAWINGS

The invention will hereafter be described with reference to the accompanying drawings, wherein like reference numerals denote like elements, and:

FIG. 13 is a side view of the powered cable puller of FIG. 1 in the storage position;

FIG. 14 is a side view of the powered cable puller of FIG. 1 as viewed from the opposite direction as FIG. 13;

FIG. 14A is a detail view of the boom along line 14A-14A of FIG. 14;

FIG. 14B is a detail view along line 14B-14B of FIG. 14;

FIG. 15 is a rear view of the powered cable puller of FIG. 1 in the storage position;

FIG. 16 is a bottom view of the powered cable puller of FIG. 1 in the storage position; and FIG. 17 is a schematic illustration of a pump and an actuator of the powered cable puller of FIG. 1.

DETAILED DESCRIPTION OF THE PREFERRED EMBODIMENT

The particulars shown herein are by way of example and only for purposes of illustrative discussion of the embodiments of the invention. The particulars shown herein are presented to provide what is believed to be the most useful and readily understood description of the principles and conceptual aspects of the invention. In this regard, no attempt is made to show structural details of the invention in more detail than is necessary for the fundamental understanding of the invention. The description taken with the drawings should make apparent to those skilled in the art how the several forms of the present invention may be embodied in practice.

Figure 1:
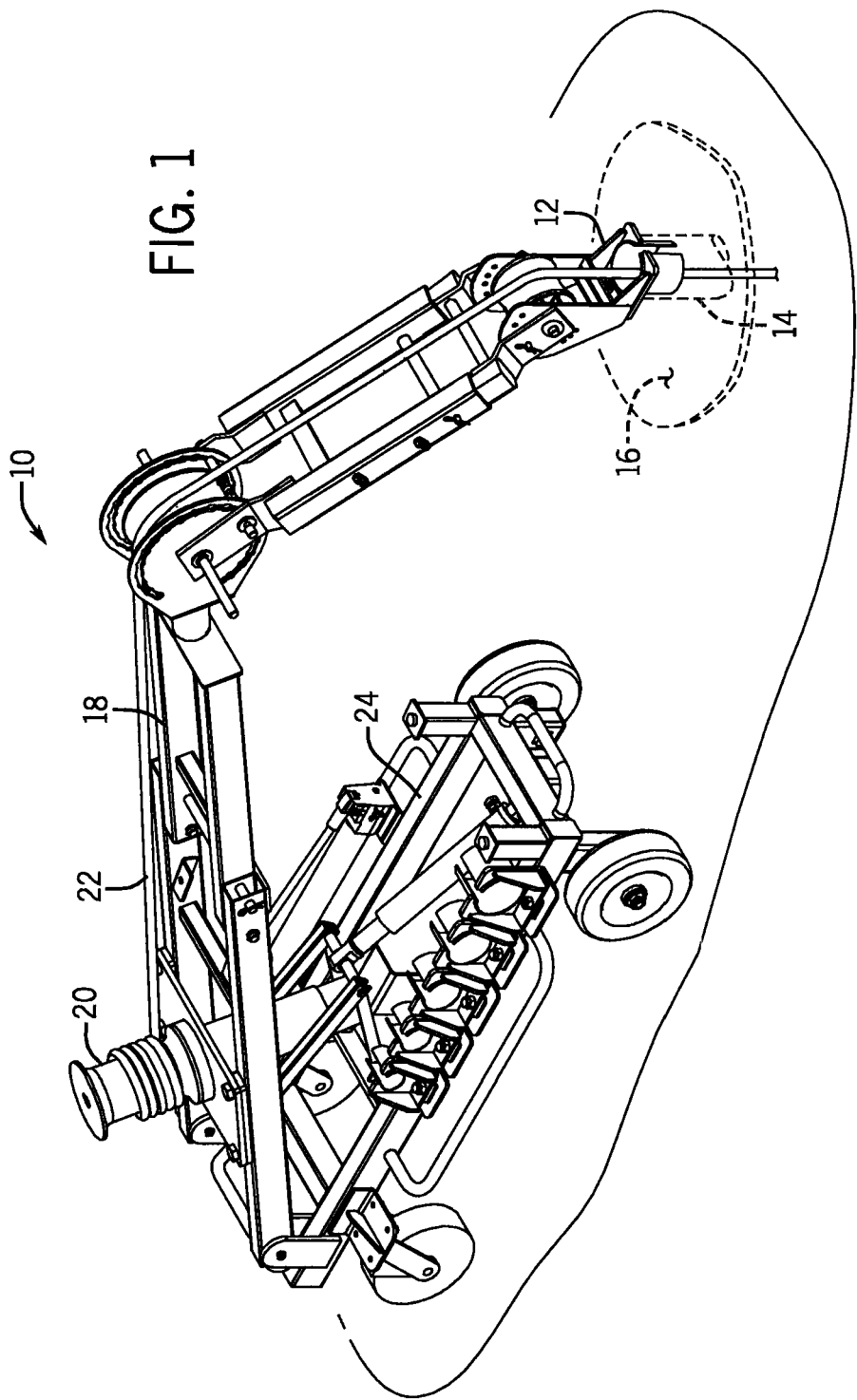
FIG. 1 is a perspective view of a powered cable puller of the invention performing an up-pull.

Referring now to the figures and particularly FIG. 1, a powered cable puller 10 of the present invention includes a conduit adapter 12 for engaging a conduit 14 that may be part of an electrical box or recessed in a wall or surface 16 of a building. The puller 10 further includes a boom 18 that supports the conduit adapter 12 and a drive unit 20 that rotates to pull a rope 22 connected to one or more cables (e.g., power cables, data cables, or other wiring). The boom 18 is pivotally supported by a frame 24 and is reconfigurable to perform various types of pulls, such as up-pulls (FIGS. 1 and 2), down-pulls (FIGS. 9 and 10) and side-pulls (FIG. 11), and to fold to a storage position (FIGS. 12-16). These components and their interactions are described in further detail in the following paragraphs, beginning with the conduit adapter 12 and then proceeding to the boom 18 and the frame 24.

Figure 2:
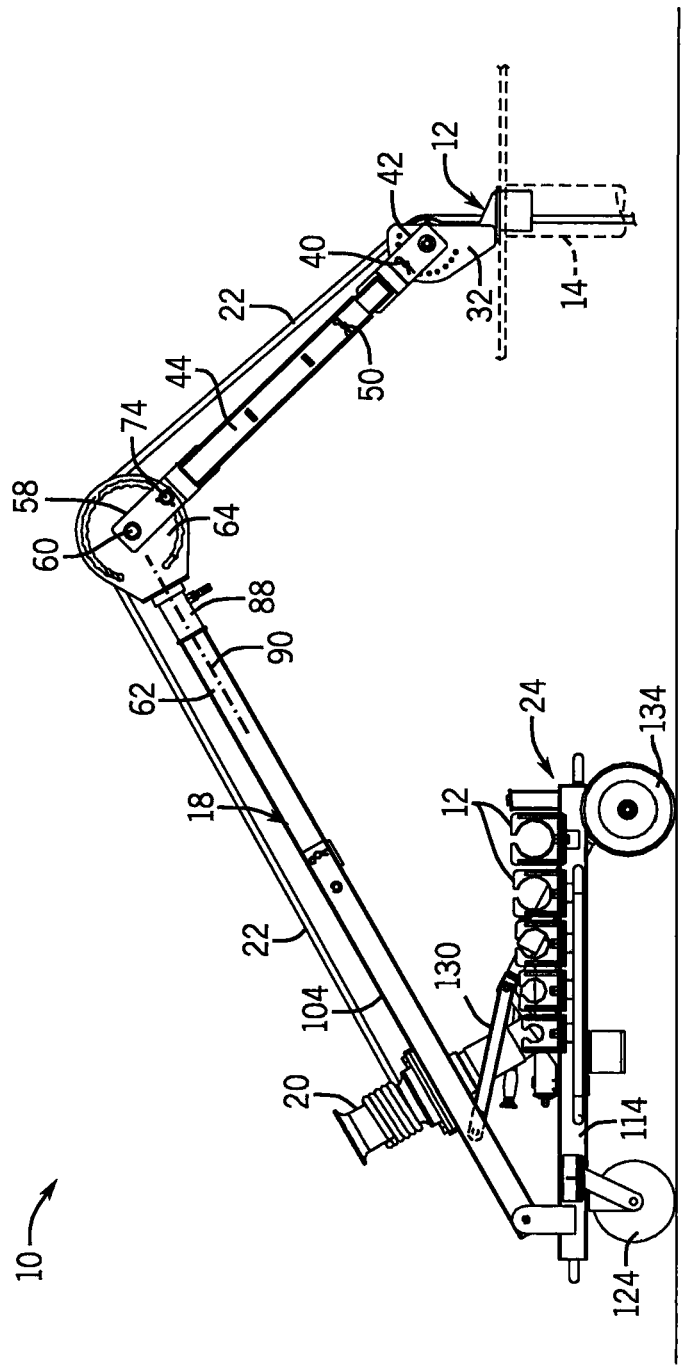
FIG. 2 is a side view of the powered cable puller of FIG. 1 performing an up-pull.
Figure 3:
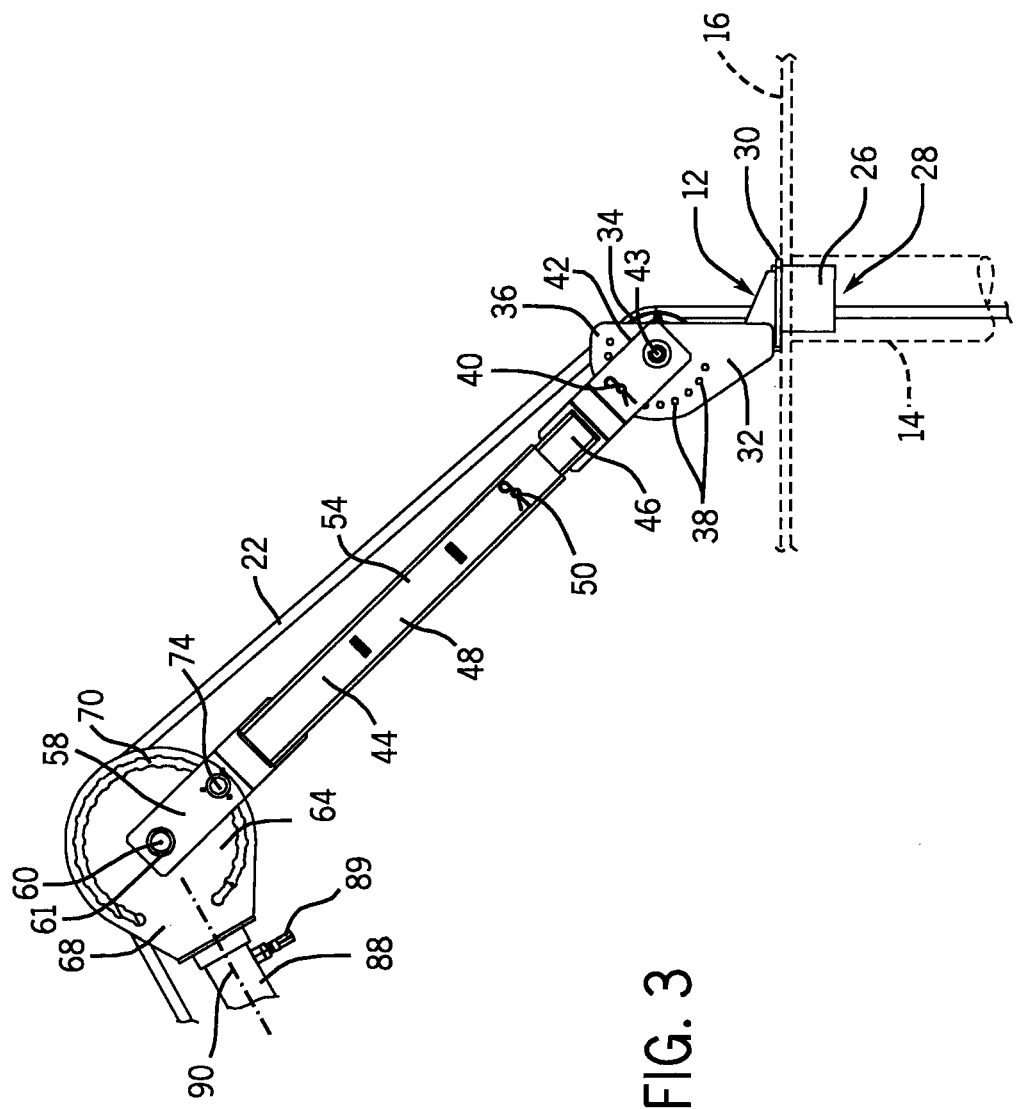
FIG. 3 is a partial side view of a boom of the powered cable puller of FIG. 1.
Figure 10:
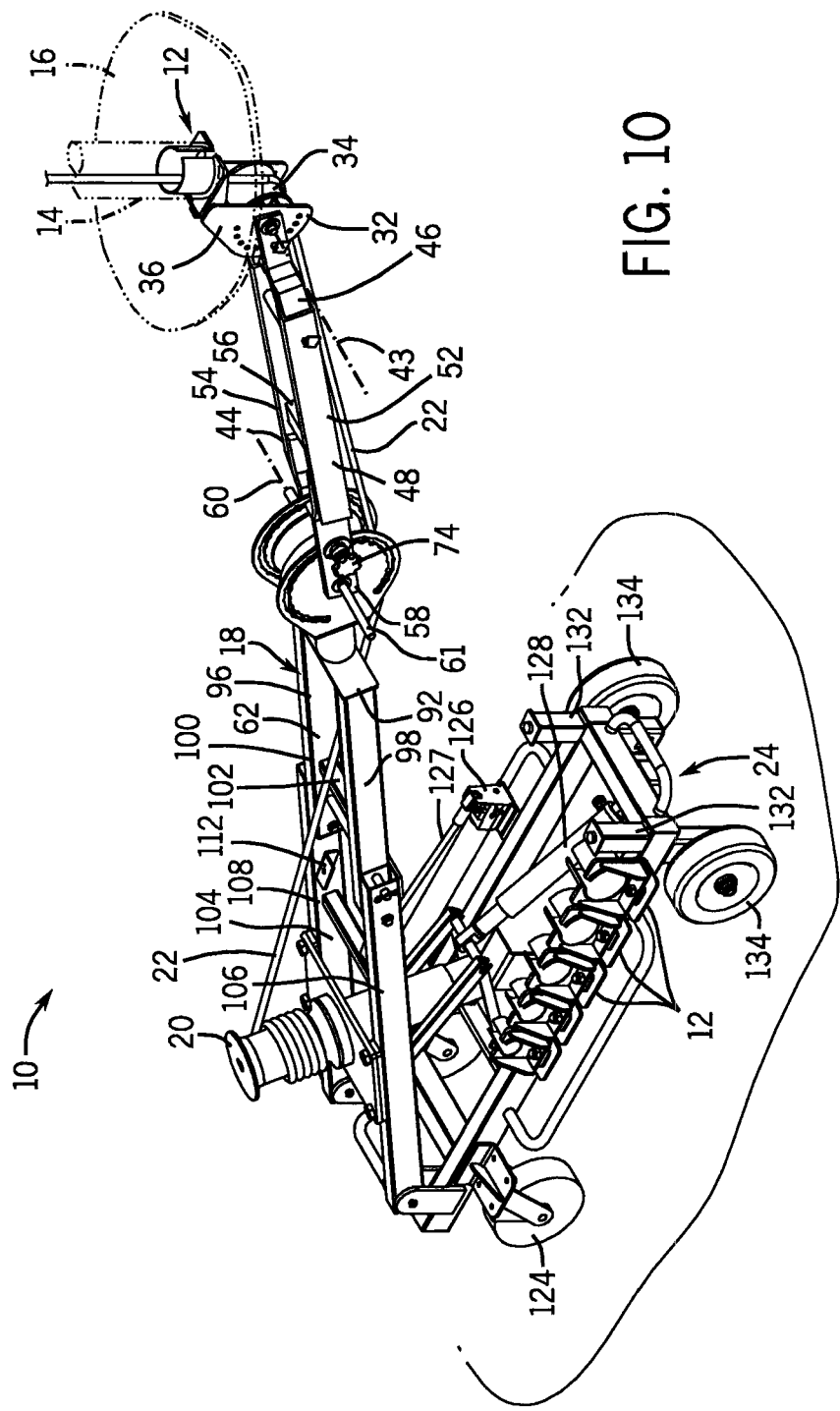
FIG. 10 is a perspective view of the powered cable puller of FIG. 1 performing a down-pull.

Referring to FIGS. 2, 3, and 10, the conduit adapter 12 includes a semi-circular adapter end 26 that engages the conduit 14. The adapter end 26 defines a passageway 28 to permit the rope 22 to pass therethrough. The adapter end 26 also connects to a support bracket 30 that connects to the boom 18. The support bracket 30 preferably releasably connects to the boom 18, for example, through threaded fasteners and the like, to permit interchangeability with adapters of other sizes.

The boom 18 includes a first end that has an adapter joint 32 that engages the conduit adapter 12. The adapter joint 32 includes a first roller 34 that is rotatably disposed between adapter side plates 36. The first roller 34 guides the rope 22 from the conduit adapter 12 and along the boom 18 to the drive unit 20. The adapter side plates 36 each include a plurality of holes 38 that accommodates a first removable cotter pin assembly 40. The first pin 40 also extends through holes in distal brackets 42 that are pivotally connected to the side plates 36. As such, the first pin 40 locks the side plates 36 relative to the distal brackets 42 when the pin 40 extends through one set of the holes 38. The first pin 40 may be removed from the holes 38 and permit the adapter joint 32 to pivot and be repositioned. It may be useful to pivot and reposition the conduit adapter 12, for example, if the surface 16 has a slight incline. In addition to supporting the first pin 40, the distal brackets 42 also permit pivotal movement of the first roller 34 and the adapter side plates 36 about an adapter axis 43.

Still referring to FIGS. 2, 3, and 10, the adapter joint 32 connects to an upper boom 44. The upper boom 44 preferably includes a telescoping boom 46 that fixedly connects to the distal brackets 42. The telescoping boom 46 also moves within a sleeve boom 48 such that the length of the upper boom 44 may be varied. The telescoping boom 46 and the sleeve boom 48 may be fixable to one another by a second removable cotter pin assembly 50. In addition, the booms 46 and 48 may each be formed from tube stock material (e.g., 2"×3" tubular steel) and include separate arms 52 and 54 connected by one or more cross members 56. The end of the upper boom 44 opposite the distal brackets 42 includes proximal brackets 58 that define a boom pivot axis 60. The upper boom 44 may pivot relative to other sections of the boom 18 about the boom pivot axis 60. It may be useful to pivot and reposition the upper boom 44, for example, to adjust the boom 18 to an appropriate height for a cable pull or to fold the boom 18 to the storage position.

Referring now to FIGS. 3-6, the upper boom 44 connects to a main boom 62. The main boom 62 includes a boom joint 64 that connects to the proximal brackets 58 at the boom pivot axis 60. The boom joint 64 includes a second roller 66 rotatably disposed between joint side plates 68. The second roller 66 guides the rope 22 to the drive unit 20. The joint side plates 68 each include an arcuate adjustment slot 70. In a preferred embodiment, each arcuate adjustment slot 70 includes a plurality of slot indentations 72, such as semi-circular surfaces. Each slot indentation 72 is positioned across from a slot indentation 72 on the opposite side of the slot 70. As such, each pair of opposite slot indentations 72 defines a slot enlargement 73, such as a circular hole that has a diameter larger than the width of arcuate connecting holes 75 between the slot enlargements 73. The slot enlargements 73 and the connecting holes 75 accommodate a second pin 74 as described below.

The second pin 74 (shown separately from the cable puller 10 in FIGS. 5A-5C) includes a shaft 71 defining an axis 77. The shaft 71 is axially movable between a fixed position and a rotation position in which the upper boom 44 is fixed and pivotable, respectively, relative to the main boom 62. In the fixed position, locking sections 76 of the shaft 71 are each disposed within one of the slot enlargements 73 in the joint side plates 68 (note that in FIG. 4 the locking sections 76 are enlarged and shown protruding from the joint side plates 68 for clarity). The locking sections 76 have a diameter larger than the width of the arcuate connecting holes 75. As such, the locking sections 76 are constrained in the slot enlargements 73 and prevent the upper boom 44 from pivoting relative to the main boom 62. As shown in FIG. 5B, the shaft 71 of the second pin 74 is moved from the fixed position to the rotation position by pulling a handle 80 fixedly connected to the shaft 71. This action results in rotation sections 78 of the shaft 71 being moved into the adjustment slot 70. The rotation sections 78 have a diameter smaller than the width of the arcuate connecting holes 75. As a result, in the rotation position the shaft 71 is permitted to move through the adjustment slot 70 and the upper boom 44 is permitted to pivot relative to the main boom 62.

Figure 5A:
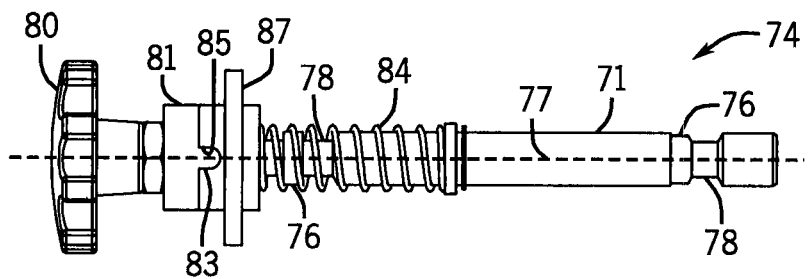
FIG. 5A is a side view of a pin of the boom joint in a fixed position.
Figure 5B:
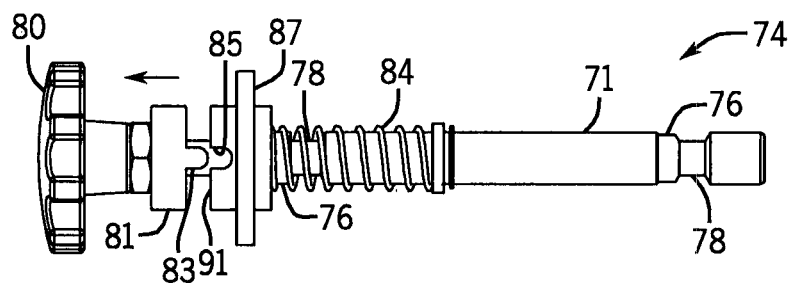
FIG. 5B is a side view of the pin of FIG. 5A with a handle pulled to move the pin to a rotation position.
Figure 5C:
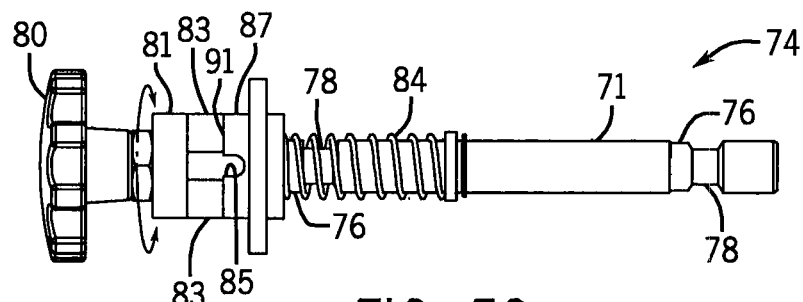
FIG. 5C is a side view of the pin of FIG. 5A with the handle pulled and rotated to lock the pin in the rotation position.

In a preferred embodiment, the second pin 74 also includes a spring 84 that biases the shaft 71 towards the fixed position. The handle 80 also includes an annular spacer 81 having fingers 83 accommodated, in the fixed position, in finger grooves 85 of a bracket 87 connected to one of the proximal brackets 58 by fasteners (not shown) or the like. As shown in FIG. 5B, the fingers 83 move from the finger grooves 85 when the handle 80 is pulled and the shaft 71 moves to the rotation position. As shown in FIG. 5C, the handle 80 may then be turned, for example, by a quarter turn, to move the fingers 83 out of alignment with the finger grooves 85. The handle 80 may then be released to permit the fingers 83 to abut the outer surface 91 of the bracket 87 and thereby hold the shaft 71 in the rotation position.

During use, a technician may pull and turn the handle 80 to secure the shaft 71 of the second pin 74 in the rotation position as described above. The technician may then configure the upper boom 44 to place the adapter 12 generally in the area of the conduit 14. Then, the technician may turn the handle 80 (for example, by an opposite quarter turn to align the fingers 83 and the finger grooves 85) such that the spring 84 forces the shaft 71 towards the fixed position. However, the upper boom 44 may still be rotated relative to the main boom 62 unless the locking sections 76 of the pin 74 are aligned with a set of slot enlargements 73. That is, the sides of the locking sections 76 will abut the side of the joint side plates 68 surrounding the arcuate connecting holes 75 unless the locking sections 76 of the pin 74 are aligned with a set of slot enlargements 73. The spring 84 will force the second pin 74 into a set of slot enlargements 73 once the locking sections 76 of the pin 74 are aligned with a set of slot enlargements 73, after which the upper boom 44 is fixed relative to the main boom 62.

From the above, it should be apparent that the second pin 74 does not need to be completely removed from the boom joint 64 to reposition the upper boom 44. In addition, the second pin 74 does not need to be awkwardly reinserted into the boom joint 64 as the upper boom 44 is held in the proper position. As such, the boom joint 64 permits the upper boom 44 to be locked and unlocked relative to the main boom 62 by a technician only using a single hand.

Figure 4:
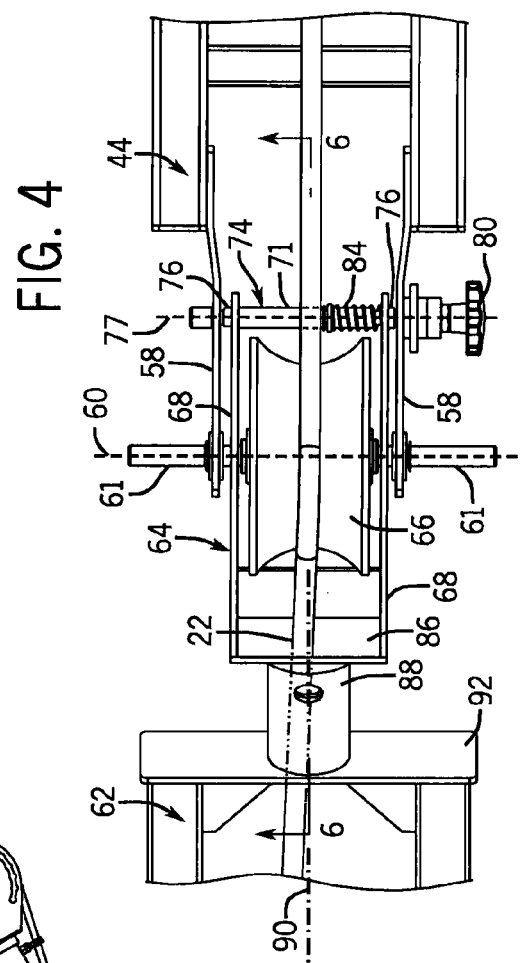
FIG. 4 is a partial top view of the boom and a boom joint of the powered cable puller of FIG. 1.
Figure 6:
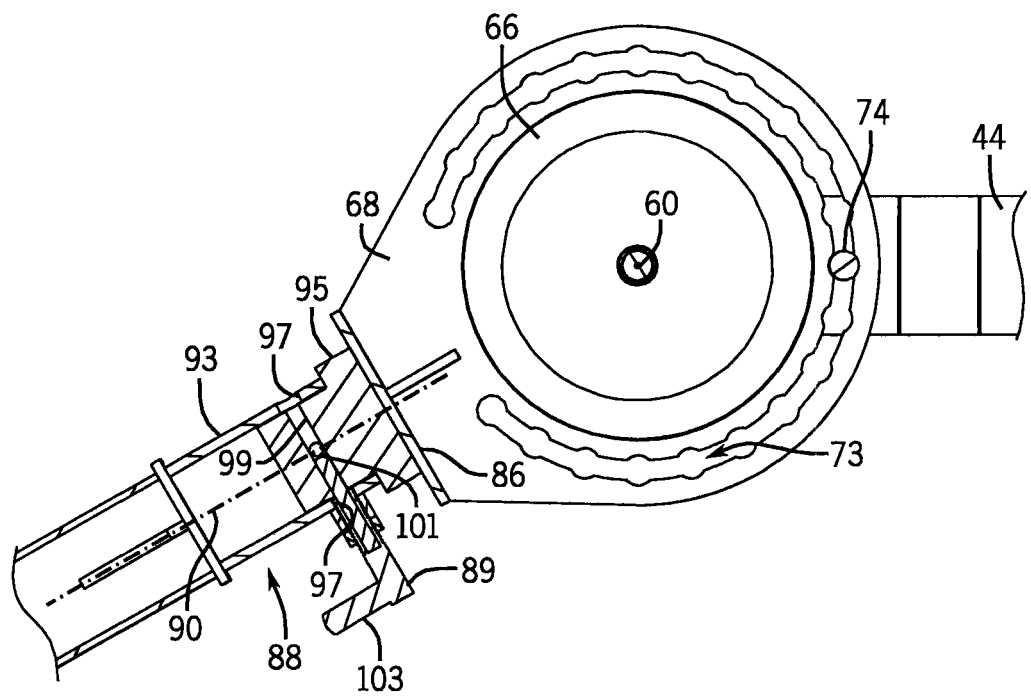
FIG. 6 is a sectional view of the boom joint along line 6-6 of FIG. 4.
Figure 11:
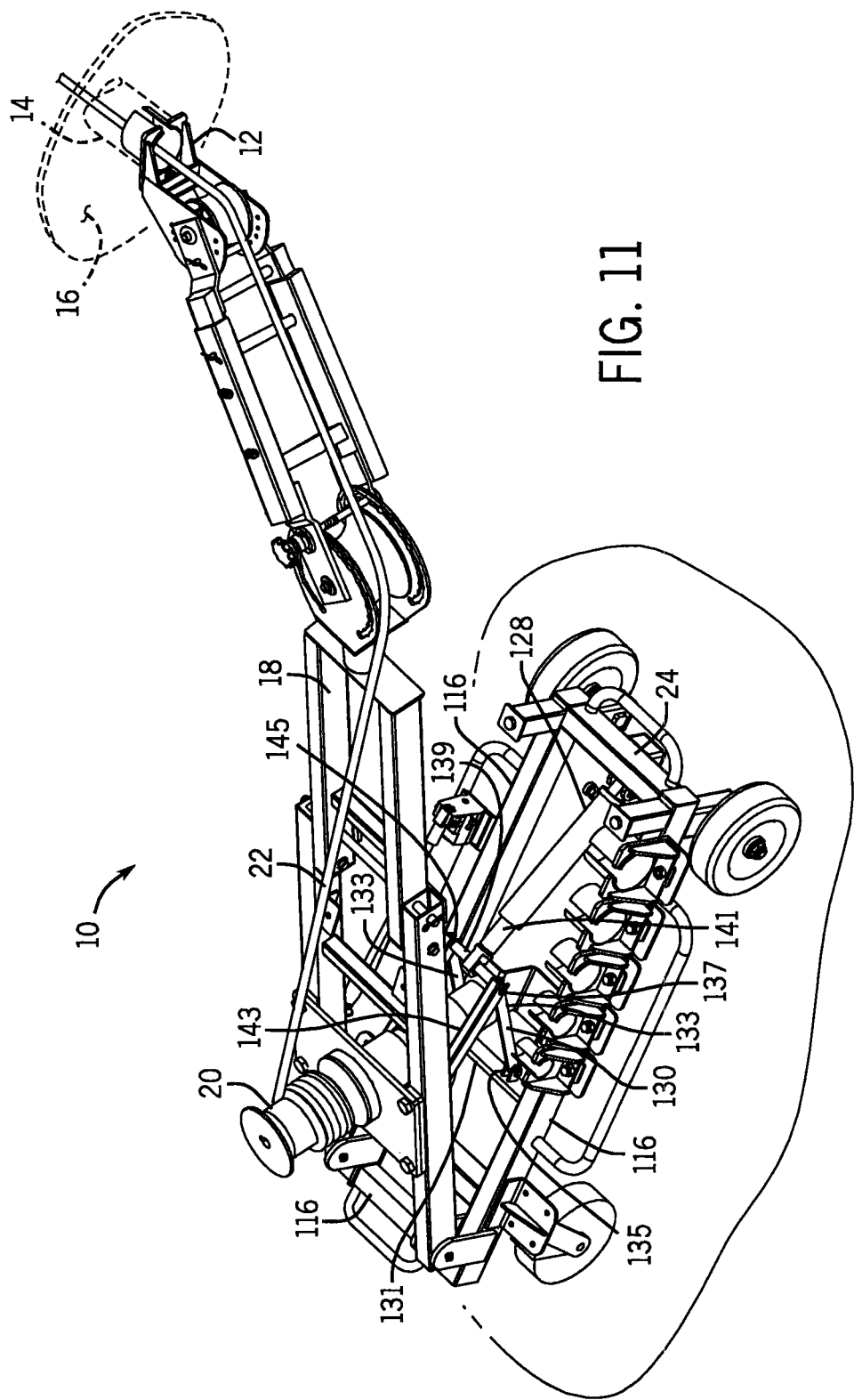
FIG. 11 is a perspective view of the powered cable puller of FIG. 1 performing a side-pull.
Figure 12:
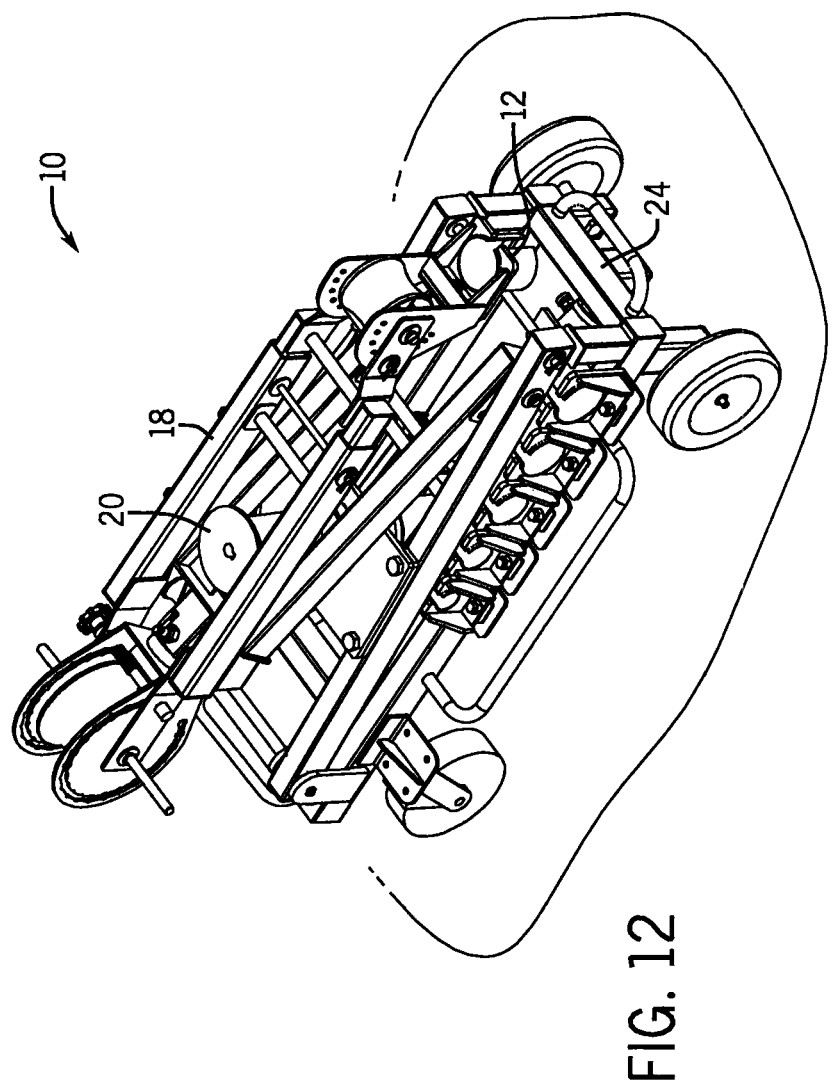
FIG. 12 is a perspective view of the powered cable puller of FIG. 1 in a storage position.

Referring now to FIGS. 4 and 6, the joint side plates 68 fixedly connect to a joint bracket 86 that supports a revolute joint 88. The revolute joint 88 includes a joint sleeve 93 that rotatably supports a joint shaft 95 fixedly connected to the joint bracket 86. The joint shaft 95, and therefore the upper boom 44, is rotatable about a revolute axis 90 that is perpendicular to the boom pivot axis 60. Rotation about the revolute axis 90 permits the upper boom 44 to be easily rotated to perform a down-pull (FIGS. 9 and 10) or a side-pull (FIG. 11). Of course, the rope 22 should be routed along the boom 18 after the upper boom 44 is rotated to the desired position so that the rope 22 does not contact or become tangled with the boom 18.

Figure 9:
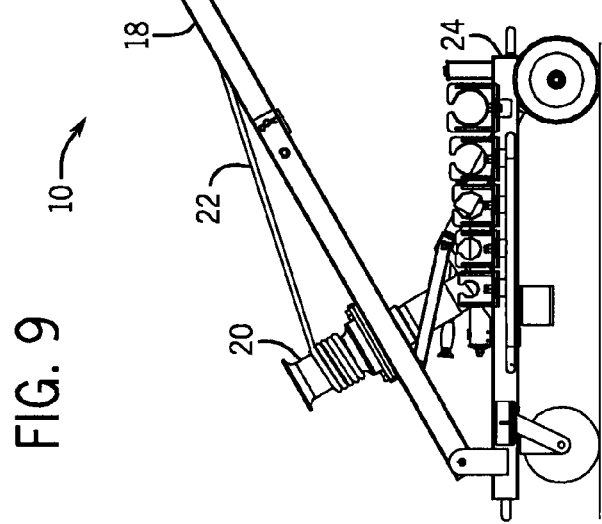
FIG. 9 is a side view of the powered cable puller of FIG. 1 performing a down-pull.

Referring specifically to FIG. 6, the joint sleeve 93 includes upper and lower pin openings 97 that are alignable with a first pin passageway 99 of the joint shaft 95 when performing an up-pull (FIGS. 1 and 2) or a down-pull (FIGS. 9 and 10). A pin assembly 89, such as a fastener that is threadably engagable with the openings 97 or the passageway 99, may be inserted into one of the openings 97 and the passageway 99 to lock the revolute joint 88 in a position for an up-pull or a down-pull. In some embodiments, as shown in FIG. 6, the pin assembly 89 may include a perpendicularly extending grip 103 for ease of rotating the pin assembly 89. The pin assembly 89 may also be removed to rotate the upper boom 44 and align the openings 97 with a second pin passageway 101 of the joint shaft 95 extending perpendicularly through the first pin passageway 99. Thereafter, the pin assembly 89 may be inserted into one of the openings 97 and the second passageway 101 to lock the revolute joint 88 in a position to perform a side pull (FIG. 11).

The revolute joint 88 advantageously permits the puller 10 to perform the different types of pulls described above. In addition, the revolute joint 88 also permits the puller 10 to operate in small spaces; for example, the puller 10 may perform a side-pull in a narrow corridor that is only slightly wider than the frame 24. Further still, the revolute joint 88 permits the puller 10 to switch between different types of pulls without requiring disassembly of the boom; for example, the upper boom 44 does not need to be separated from the main boom 62.

In addition to providing the multiple pivot axis structure described above, the boom joint 64 also supports handles 61 that extend along the pivot axis 60. When the boom 18 is folded to the storage position (FIG. 12), the handles 61 are positioned such that they may be easily grasped by a technician and the puller 10 may be moved thereby.

Figure 7:
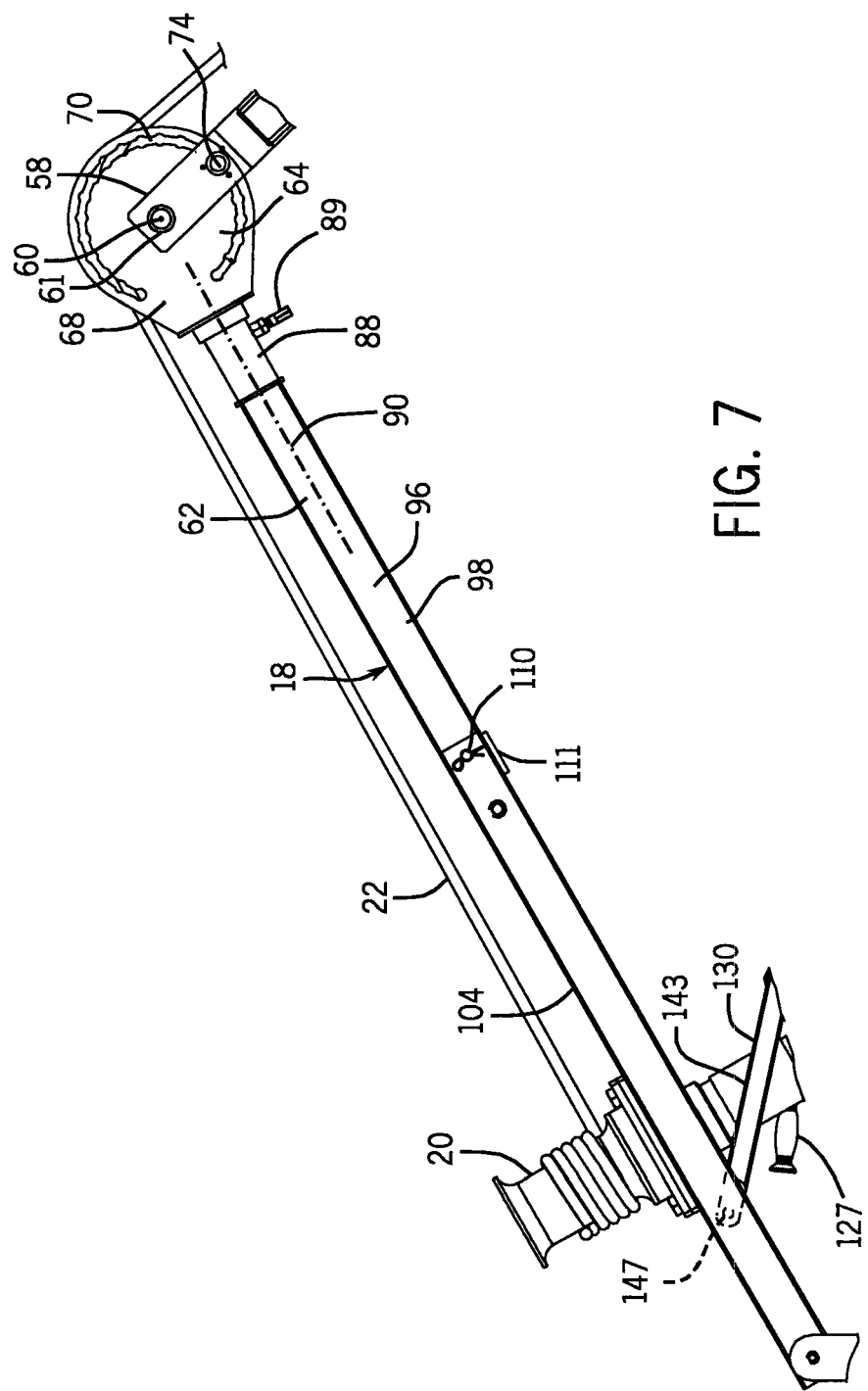
FIG. 7 is another partial side view of a boom of the powered cable puller of FIG. 1.

Referring now to FIGS. 2, 7, and 10, the revolute joint 88 connects to an intermediate bracket 92 that is supported by an intermediate boom 96. The intermediate boom 96 may include separate tube stock arms 98 and 100 connected by one or more cross members 102. The intermediate boom 96 pivotally connects to a lower boom 104 that may include separate tube stock arms 106 and 108. The intermediate and lower booms 96 and 104 may be fixable to one another by a second removable cotter pin assembly 110. The lower boom 104 includes stopper plates 111 that support the intermediate boom 96 in the operating position and support brackets 112 that support the intermediate boom 96 in the storage position. The lower boom 104 removably supports the drive unit 20, which may be any appropriate design known to those skilled in the art, such as capstan that has a rotatable spool. In addition, a proximal end of the lower boom 104 pivotally connects to the frame 24.

Figure 8:
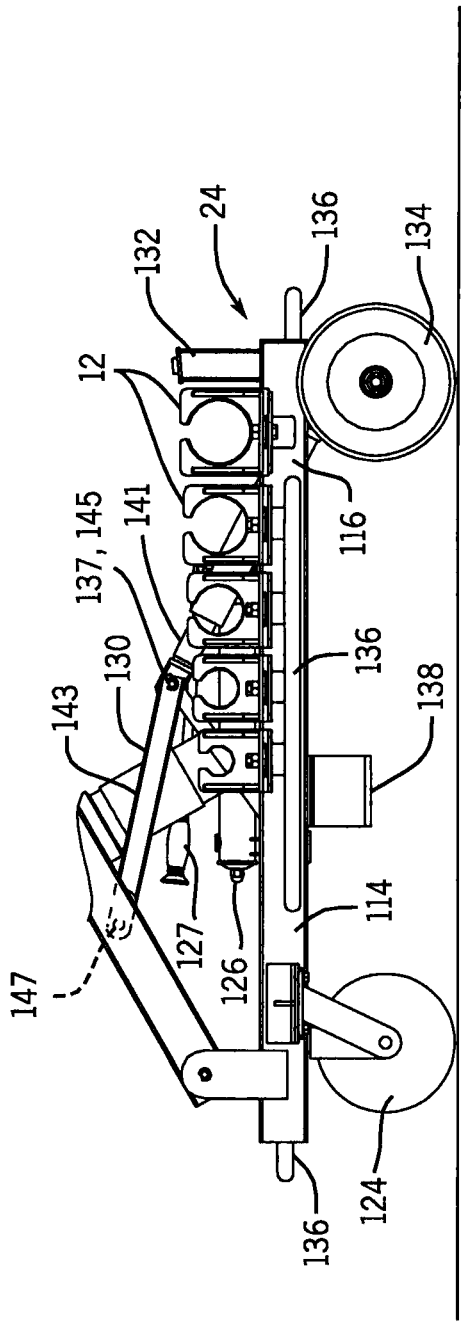
FIG. 8 is a partial side view of a frame of the powered cable puller of FIG. 1.

Referring to FIGS. 8, 10, and 11, the frame 24 includes a base 114 that has a generally rectangular shape. The base 114 is defined by several arms 116 that may be, for example, the same tube stock material used to form the arms of the boom 18. The rear end of the base 114 connects to rear wheels 124. The rear wheels 124 may be braked casters that rotate about a vertical axis to permit, together with the handles 61, the puller 10 to be easily steered by a technician. These components also permit the puller 10 to be easily steered even if it is heavy and has a relatively high pulling capacity.

One of the base arms 116 preferably removably supports several conduit adapters 12 of various sizes that may be interchanged with the conduit adapter 12 connected to the boom 18. The opposite base arm 116 supports a pump 126, such as a manually-driven hydraulic pump including a manual pump handle 127, that is in fluid communication with an actuator 128 that pivotally connects to the base 114 and the boom 18 to raise and lower the boom 18.

Referring specifically to FIG. 17, a hydraulic fluid reservoir 151 supplies hydraulic fluid through a hydraulic fluid delivery line 153 to the pump 126 as the handle 127 is pivoted toward the pump 126. The pump 126 supplies hydraulic fluid through an actuator line 155 to the actuator 128 to extend the actuator rod 141 and thereby lift the boom 18. In addition, the pump 126 includes a manual valve 157, such as a screw valve commonly used with bottle jacks and the like, positioned along a hydraulic fluid return line 159 connected to the reservoir 151. The valve 157 may be opened to permit the boom 18 to lower under its own weight and thereby force hydraulic fluid to pass through the return line 159 and into the reservoir 151. The return line 159 preferably includes a flow limiter 161 to reduce the flow rate as the hydraulic fluid returns to the reservoir 151, thereby forcing the boom 18 to lower slowly. That is, the flow limiter 161 has a fluid passageway having a smaller cross-sectional area than that of the actuator line 155, so as to slow down the rate that the boom 18 will lower under its own weight when the valve 157 is opened. The pump 126 may also include other appropriate components recognized by those skilled in the art, such as check valves, pilot valves, and the like.

The actuator 128 also pivotally connects to a linkage assembly 130 that raises and lowers the lower boom 104 as the actuator 128 extends and retracts, respectively. As best understood from FIG. 11, the actuator 128 extends to unfold the linkage assembly 130 and raise the lower boom 104. Conversely, the actuator 128 retracts to fold the linkage assembly 130 and lower the lower boom 104.

Referring to FIGS. 8 and 11, the linkage assembly 130 is supported by a cross member 131 connected between the base arms 116. The linkage assembly 130 includes lower links 133 that are preferably identical components. Each lower link 133 includes a first end 135 pivotally connected to the cross member 131 and a second end 137 pivotally connected to an actuator cross member 139. As the name implies, the actuator cross member 139 connects to the extendable rod 141 of the actuator 128. Upper links 143 of the linkage assembly 130 are also preferably identical components and each includes a first end 145 pivotally connected to the actuator cross member 139. Each upper link 143 also includes a second end 147 (FIG. 8) pivotally connected to the one of the arms 106 or 108 of the lower boom 104.

The actuator 128 preferably only extends a limited amount (e.g., an amount such that the lower boom 104 rotates at most 30 degrees relative to the base 114). The pump 126, actuator 128, and the linkage assembly 130 advantageously support the boom 18 during a pull and during setup for a pull, thereby reducing the amount of lifting required by a technician. These components also help hold the conduit adapter 12 in engagement with the conduit 14 during a down-pull. Alternatively, the pump 126 and the actuator 128 could be replaced by a manual crank lift (not shown).

A front end of the base 114 connects to one or more boom supports 132 that support the lower boom 104 in the storage position. The front end of the base 114 also connects to front wheels 134 that are preferably fixed axle wheels. Each of the base arms 116 preferably connects to a lifting handle 136. The lifting handles 136 may be used to lift the puller 10, for example, into a vehicle. The sides of the base 114 also preferably connect to a drive unit bracket 138 that supports the drive unit 20 in the storage position.

The powered puller 10 is preferably set up for a pull as follows: starting from the storage position, the rear wheels 124 are locked using the brakes. Next, the hydraulic pump 126 is operated, for example, using the manual pump handle 127, to pivot and lift the lower boom 104 above the frame 24. The intermediate boom 96 is then unfolded from the lower boom 104 so that the stopper plates 111 support the intermediate boom 96. The intermediate boom 96 is also locked in place by the pin assembly 110. Next, the second pin 74 is moved to the second position to permit the upper boom 44 to pivot upwardly. The second pin 74 is then moved to the first position to fix the upper boom 44 relative to the intermediate boom 96. Next, the telescoping boom 46 may be extended from the sleeve boom 48 and the upper boom 44 may be rotated about the revolute axis 90 if a down-pull or a side-pull is to be performed. Finally, the first pin 40 may be removed such that the conduit adapter 12 may be repositioned to engage the conduit 14.

From the above disclosure, it should be apparent that the powered cable puller of the invention may provide any combination of the following advantages: high pulling capacity and ease of movement and reconfiguration in an operating position, performance of various types of pulls even in relatively small spaces, and ease of transport in a storage position.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims that follow.

We claim:

1. An apparatus for pulling a cable through a conduit, comprising:
   a frame;
   a boom pivotally connected to the frame and being configured to guide a rope connected to the cable along the boom, the boom including:
   a first member;
   a second member;
   a joint pivotally connecting the first member to the second member and including:
   a pin having an axis and being movable axially from a first position to a second position and vice versa, in the first position the pin fixing the first and second members angularly relative to one another and in the second position permitting the first and second members to pivot relative to one another, in both the first position and the second position the pin being constrained by the joint, and the pin being biased toward the first position; and
   an adjustment slot through which the pin moves when the pin is in the second position.

2. The apparatus of claim 1, wherein the adjustment slot includes a plurality of slot enlargements, and the pin includes at least a first locking section received and constrained in one of the slot enlargements in the first position to angularly fix the first and second members.

3. An apparatus for pulling a cable through a conduit, comprising:
   a frame including a base;
   a boom including:
   at least one roller configured to guide a rope connected to the cable along the boom;

a main boom pivotally connected to the base;
an upper boom pivotally connected to the main boom;
a drive unit connected to the boom and including a rotatable spool configured to pull the rope along the boom;
a lift pivotally connected to the frame and the boom, the lift being operable to move the boom relative to the frame, and
a linkage assembly pivotally connecting the base, the boom, and the lift,
wherein the linkage assembly includes:
at least a first lower link having a first end pivotally connected to the base and a second end pivotally connected to the lift; and
at least a first upper link having a first end pivotally connected to the lift and the first lower link and a second end pivotally connected to the boom.

4. The apparatus of claim 3, wherein the lift includes a linear actuator having a first end pivotally connected to the base and an extendable rod pivotally connected to the second end of the first lower link and the first end of the first upper link.

5. The apparatus of claim 4, wherein the linear actuator extends to unfold the linkage assembly and raise the boom relative to the frame, and the linear actuator retracts to fold the linkage assembly and lower the boom relative to the frame.

6. An apparatus for pulling a cable through a conduit, comprising:
a frame including a base;
a boom including:
at least one roller configured to guide a rope connected to the cable along the boom;
a main boom pivotally connected to the base;
an upper boom pivotally connected to the main boom;
a drive unit connected to the boom and including a rotatable spool configured to pull the rope along the boom; and
a lift pivotally connected to the frame and the boom, the lift being operable to move the boom relative to the frame,
wherein the lift includes:
an actuator pivotally connected to the frame and the boom, the actuator being operable to move the boom relative to the frame; and
a hydraulic pump in fluid communication with the actuator and being operable to extend and retract the actuator.

7. The apparatus of claim 6, wherein the hydraulic pump is a manually-driven pump including a pump handle.

8. The apparatus of claim 6, further comprising:
an actuator line through which the hydraulic pump fluidly communicates with the actuator, the actuator line having a passageway with a first cross-sectional area;
a hydraulic fluid reservoir;
a hydraulic fluid return line through which the pump fluidly communicates with the hydraulic fluid reservoir, the hydraulic fluid return line having a passageway with a second cross-sectional area, the second cross-sectional area being less than the first cross-sectional area to limit a speed at which the boom lowers under its own weight.

9. The apparatus of claim 8, wherein the hydraulic fluid return line includes a flow limiter having the passageway with the second cross-sectional area.

10. The apparatus of claim 8, wherein the hydraulic fluid return line further includes a manual valve through which hydraulic fluid passes to return to the hydraulic fluid reservoir from the actuator.

11. An apparatus for pulling a cable through a conduit, comprising:
a frame;
a boom pivotally connected to the frame and including:
at least one roller configured to guide a rope connected to the cable along the boom;
a first member;
a second member; and
a joint connecting the first member to the second member, the joint defining a first axis about which the second member is pivotable relative to the first member and a second axis about which the second member is rotatable relative to the first member, the second axis being perpendicular to the first axis.

12. The apparatus of claim 11, further comprising a plurality of ground-engaging wheels, at least some of the wheels being rotatable about a vertical axis to steer the apparatus thereby.

13. The apparatus of claim 12, wherein the joint includes the at least one roller, the roller being rotatable about the first axis and configured to engage the rope.

14. The apparatus of claim 12, wherein the joint includes:
a plurality of pairs of circular holes defined by the first member and the second member;
a pin removably disposed in one of the pairs of circular holes to fix the first and second members angularly relative to one another about the first axis.

15. The apparatus of claim 12, wherein the joint includes:
a joint sleeve defining the second axis; and
a joint shaft rotatably supported within the joint sleeve to rotate about the second axis.

16. The apparatus of claim 15, wherein the joint sleeve includes an opening and the joint shaft includes a first passageway being alignable with the opening, and wherein the joint further includes a pin assembly being insertable into the opening and the first passageway to angularly fix the joint sleeve and the joint shaft relative to one another.

17. The apparatus of claim 14, wherein the joint includes an adjustment slot in communication with the plurality of pairs of circular holes defined by the first member and the second member, and the pin having an axis and being movable axially from a first position to a second position and vice versa, in the first position the pin fixing the first and second members angularly relative to one another about the first axis and in the second position permitting the first and second members to pivot relative to one another about the first axis, the pin being constrained by the joint in both the first position and the second position and moving through the adjustment slot when the pin is in the second position, and the pin being biased toward the first position.

18. The apparatus of claim 12, wherein the first member is a main boom pivotally connected to the frame and the second member is an upper boom.

* * * * *